United States Patent
Atkins et al.

(10) Patent No.: US 8,539,274 B2
(45) Date of Patent: Sep. 17, 2013

(54) LOAD SHEDDING DURING EMERGENCY POWER OFF EVENT

(75) Inventors: Robert G. Atkins, Poughkeepsie, NY (US); Edward N. Cohen, Kingston, NY (US); Philip M. Corcoran, Highland, NY (US); William J. Petrowsky, Kingston, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/725,844

(22) Filed: Mar. 17, 2010

(65) Prior Publication Data

US 2011/0231689 A1    Sep. 22, 2011

(51) Int. Cl.
G06F 11/30    (2006.01)
G06F 1/00    (2006.01)

(52) U.S. Cl.
USPC .......................... 713/340; 713/300; 713/324

(58) Field of Classification Search
USPC ................. 713/300, 320, 324, 340
See application file for complete search history.

(56) References Cited

U.S. PATENT DOCUMENTS

| | | | |
|---|---|---|---|
| 4,031,406 A | 6/1977 | Leyde et al. | 307/41 |
| 4,075,699 A | 2/1978 | Schneider et al. | 700/291 |
| 4,135,101 A | 1/1979 | Young et al. | 307/39 |
| 4,341,345 A | 7/1982 | Hammer et al. | 236/46 R |
| 4,868,832 A * | 9/1989 | Marrington et al. | 714/22 |
| 5,381,554 A * | 1/1995 | Langer et al. | 714/14 |
| 5,523,868 A * | 6/1996 | Hawley | 398/38 |
| 5,923,099 A * | 7/1999 | Bilir | 307/64 |
| 6,691,248 B1 * | 2/2004 | Nishijima et al. | 714/14 |
| 7,013,399 B2 * | 3/2006 | Sisler et al. | 713/310 |
| 7,058,835 B1 * | 6/2006 | Sullivan et al. | 713/324 |
| 7,142,950 B2 | 11/2006 | Rasmussen et al. | 700/286 |
| 7,418,314 B2 | 8/2008 | Rasmussen et al. | 700/286 |
| 7,451,336 B2 | 11/2008 | Manuell et al. | 713/324 |
| 7,478,251 B1 * | 1/2009 | Diab et al. | 713/300 |
| 7,886,165 B2 * | 2/2011 | Khan et al. | 713/300 |
| 8,214,165 B2 * | 7/2012 | Dishman et al. | 702/60 |
| 2007/0168088 A1 * | 7/2007 | Ewing et al. | 700/295 |

OTHER PUBLICATIONS

Dialog/CSA abstract for Zhang, Wei et al., "Automatic Load Shedding Emergency Control Algorithm of Power System Based on Wide-Area Measurement Data" College of Electrical Engineering, Southwest Jiaotong University, Chengdu 610031, Sichuan Province, China Dianwang Jishu / Power System Technology, v 33, n. 3, p. 69-73, Feb. 2009.

Dialog/CSA abstract for Vittal, Vijay, "Stability and Control of Dynamical Systems with Applications", Birkhauser Verlag AG, pp. 293-314 (2003).

* cited by examiner

*Primary Examiner* — Suresh Suryawanshi
(74) *Attorney, Agent, or Firm* — Dennis Jung; Ido Tuchman

(57) ABSTRACT

A method, apparatus, and computer program product for load shedding during an emergency power off event. In one embodiment, power is supplied from a main power source to a plurality of electrical loads within a device enclosure. Power loss is detected from the main power source. Upon detecting the power loss, at least one of the electrical loads is disconnected from a supplemental power source such that power to at least one remaining load connected to the supplemental power source is sustained by the supplementary power source.

16 Claims, 3 Drawing Sheets

US 8,539,274 B2

LOAD SHEDDING DURING EMERGENCY POWER OFF EVENT

BACKGROUND

Various embodiments described herein relate to systems generally, including load shedding during emergency power off event.

In the event of an emergency power off (EPO), certain devices such as disk drives need to be made aware of the impending power loss with enough time to complete open transactions or data can by lost or corrupted. To provide hold up time, hold-up capacitors are sometimes used at needed voltage levels, although they can be expensive and space consuming.

SUMMARY

An example embodiment of the present invention is a method of load shedding during an emergency power off event. The method includes the step of supplying power from a main power source to a plurality of electrical loads within a device enclosure. The method further includes the step of detecting a power loss from the main power source. Upon detecting the power loss, the method includes the step of disconnecting at least one of the electrical loads from a supplemental power source such that power to at least one remaining load connected to the supplemental power source is sustained by the supplementary power source.

Another example embodiment of the invention is an apparatus. The apparatus includes a main power supply within a device enclosure. The apparatus further includes a supplemental power supply within the device enclosure electrically that is coupled with the main power supply. The apparatus also includes a soft switch. The soft switch is configured to disconnect at least one secondary device from the supplemental power supply upon power loss from the main power supply while power to at least one primary device connected to the supplemental power supply is sustained by the supplemental power supply.

Yet a further example embodiment of the invention is a computer program product for load shedding during an emergency power off event. The computer program product includes computer readable program code configured to receive a power loss signal from a power loss detection circuit indicating a power loss from a main power source. Upon receipt of the power loss signal, the computer readable program code is further configured to transmit a soft switch signal to a soft switch to disconnect at least one electrical load from a supplemental power source while power to at least one remaining load connected to the supplemental power source is sustained by the supplemental power source.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-3.

Aspects of the invention relate to a method and apparatus for load shedding during an emergency power off event. In computing, there are certain devices that need to be informed ahead of time that they are going to lose power imminently in order that they have time to take certain actions in preparation for this emergency power off event. One such device is a disk drive. The drive needs, for example, to be able to complete open transactions prior to power off or data can be lost.

Embodiments of the current invention take advantage of the fact that computing devices are often designed with multiple different kinds of loads on a given voltage level, and many of the loads do not need to be informed of a power off event. In an embodiment of the invention, loads not requiring advance notice of power off are placed behind a soft switch. After detecting a power off event, load shedding is performed by activating/deactivating a soft switch so that only the important loads remain drawing current against a secondary power source, such as a hold up capacitor. When a load is shed on a particular voltage, it increases the amount of time that remaining devices can draw current from the secondary power source.

Embodiments of the present invention takes advantage of the fact that power supplies are often designed with multiple different kinds of loads on a given voltage level, and that many of those loads do not need to be informed of a power off event. By placing loads not requiring advance notice of power off behind a soft switch, detecting the imminent power off event, and load shedding turning the soft switch so that only the important loads remain drawing current against a supplemental power supply, such as hold up capacitance. Once that is done, the loads of interest will be the only ones drawing current from the levels that are about to go down which will not be held up longer.

Figure 1:
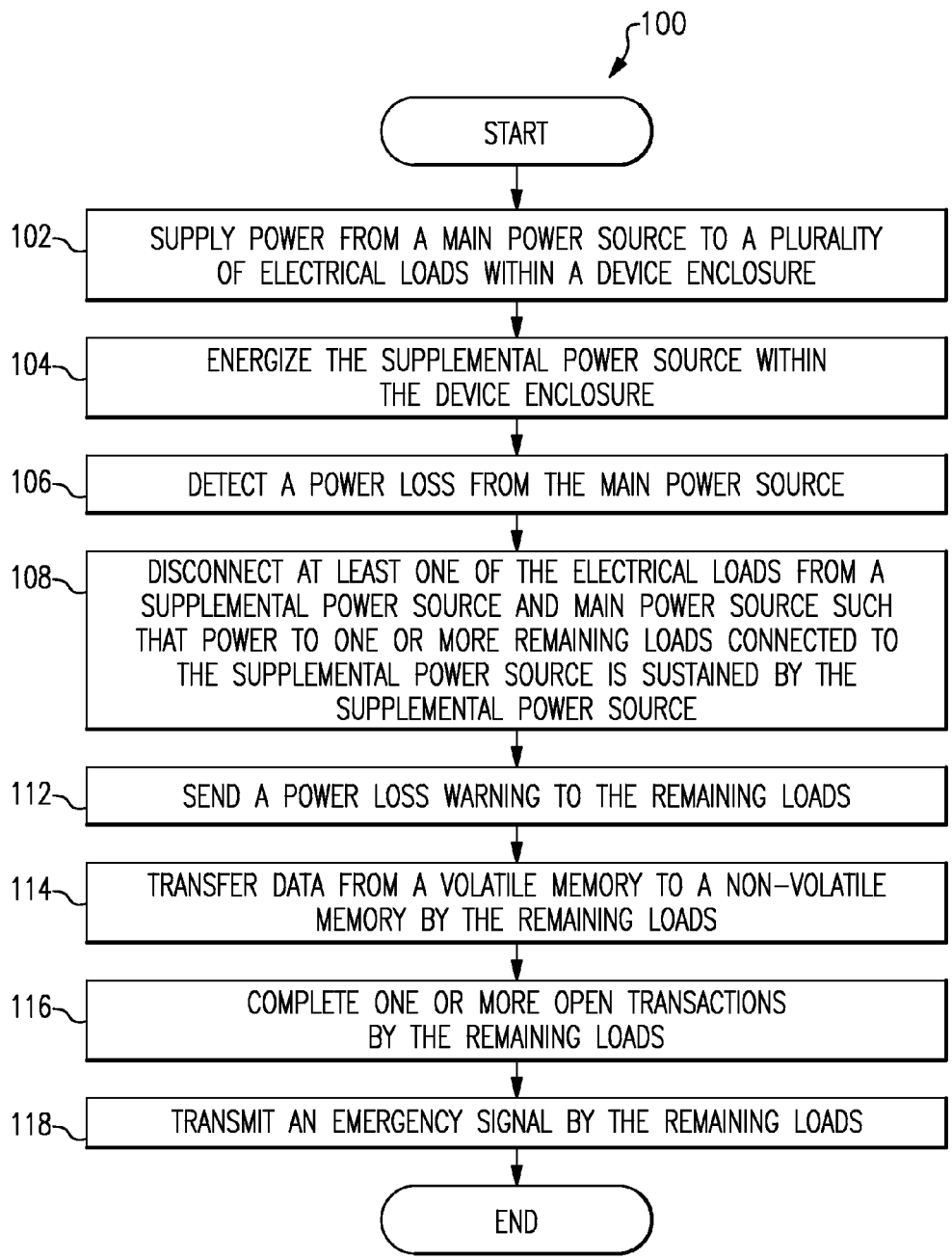
FIG. 1 is a flow diagram illustrating operations performed by one embodiment of the present invention.

FIG. 1 is a flow diagram illustrating operations performed by one embodiment of the present invention. The flow diagram 100 begins at block 102 and includes supplying power from a main power source to a plurality of electrical loads within a device enclosure. The main power source, such as a linear or switched-mode power supply unit, can receive its power from a number of different sources including, but not limited to, power from a wall socket or a battery. In one embodiment, the input voltage to the main power supply is in the range of 110-240V AC.

The input voltage is typically stepped-down by the main power source to one or more output voltages. The output voltages from the main power supply are typically DC voltages, however, it is contemplated that AC voltages may also be output by the main power supply. In one embodiment, the output voltages from the main power supply are +12V, −12V, +5V, −5V and +3.3V. A plurality of electrical loads includes any load drawing power from the main power supply. This may include hard drives, a disk subsystem, fans, expansion cards, processors, input and output devices. A device enclosure may include any chassis, cabinet, rack, box, housing or case.

Next, at block 102, the supplemental power source is energized within the device enclosure. The supplemental power source may include, but is not limited to, holdup capacitance, a photocell, a battery, or regenerative power. The supplemental power source may be energized by the main power supply, either directly or indirectly, or from an external source.

The method 100 may include, at block 106, detecting a power loss from the main power source. Power loss may be detected in a variety of ways, including for example detecting a drop in voltage and detecting a drop in current, detecting a drop in undercurrent, and detecting a drop in the amount of solar light.

Upon detecting the power loss, at least one of the electrical loads is disconnected from the supplemental power source at block 108, such that power to at least one remaining load connected to the supplemental power source is sustained by the supplementary power supply. Thus, when the power to the main power source is lost, load shedding occurs. The load shedding increases the amount of time the supplemental power source can be used to power the remaining devices in the enclosure that have not been disconnected from the supplemental power source. Block 108 may further include disconnecting at least one of the electrical loads from the main power source upon detecting the power loss. Disconnecting the loads from either the main or supplemental power sources may include, but is not limited to activating or deactivating a soft switch, depending on whether the soft switch is configured to be normally on or normally off.

After the detection of power loss at block 106, the method 100 may include, at block 112, sending a power loss warning to the remaining load(s) still connected to the supplemental power source. This power loss warning may include sending a signal to the remaining load to notify the load that power will be lost imminently and to prepare to power down. Additionally, at block 114, the method 100 may include transferring data from a volatile memory to a non-volatile memory by the remaining load(s) in response to the power loss warning. If the remaining load is volatile memory, such as dynamic random access memory (DRAM), the volatile memory or a portion thereof may be transferred to non-volatile memory, such as flash memory, so as to preserve the data when power is lost. The method 100 may also include, at block 116, completing one or more open transactions by the remaining load(s). Many loads, such as hard disk drives, need time to complete open transactions before powering down to avoid data loss and corruption.

Method 100 may also include transmitting an emergency signal by the remaining load(s) at block 118. Upon detecting a loss of power, a device may transmit a signal that a power loss is imminent. The signal may include information stored on the device. This signal may include, for example, the geographical or network location of the device and may be repeated until power from the supplementary power source is depleted.

Figure 2:
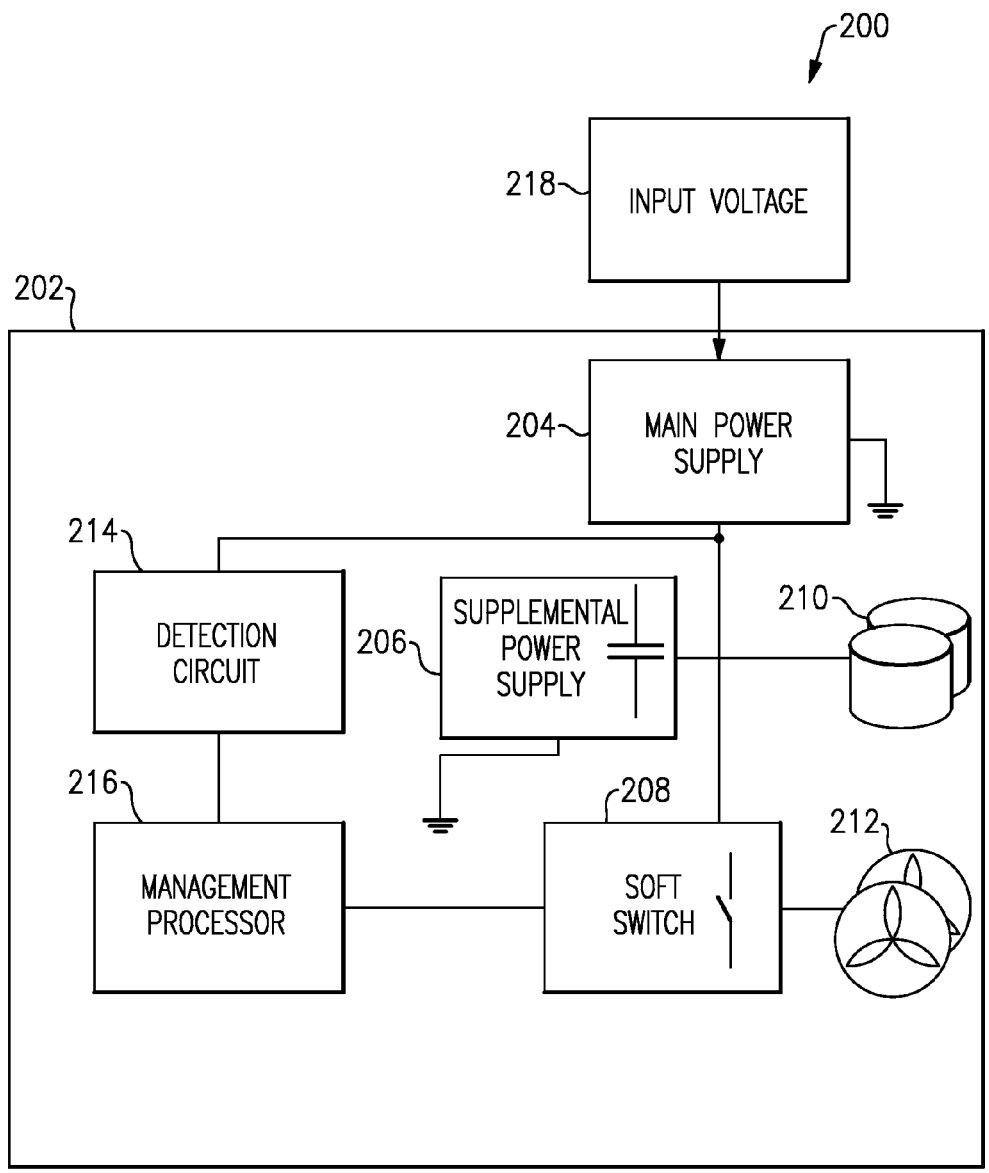
FIG. 2 is a block diagram illustrating an example system for load shedding during an emergency power off event, as contemplated by the present invention.

FIG. 2 is a block diagram illustrating an example system 200 for load shedding during an emergency power off event, as contemplated by the present invention. As depicted in FIG. 2, the system 200 may include an enclosure 202, a main power supply 204, a supplemental power supply 206, a soft switch 208, primary devices 210, secondary devices 212, a detection circuit 214, a management processor 216, and an input voltage 218. The system 200 may be a distributed power system.

External power can enter the enclosure 202 through the input voltage 218 from an external source such as a wall socket or from an external generating source, such as a gas generator or solar panel. This external power may be direct current (DC) or alternating current (AC). The input voltage 218 may power the main power supply 204. The main power supply 204 may convert the input voltage from AC to DC. In various embodiments of the invention, power from the main power supply 204 is used to energize the supplemental power supply 206. The supplemental power supply 206 may be electrically coupled to the main power supply 204 in series or in parallel. The supplemental power supply 206 may be used to sustain the primary loads 210 for a particular period of time until the loads 210 complete open transactions or can power down normally. The supplementary power supply 206 may include, but is not limited to, holdup capacitance, a photocell, a battery, or regenerative power. The primary loads 210 may include but is not limited to a hard drive, hard drive array, or a transmission device.

The soft switch 208 connects the supplemental power supply 206 with the secondary devices 212. The soft switch 208 may include an electronic switch, such as a field effect transistor (FET), or a mechanical switch, such as a relay. In one embodiment of the invention, the primary devices 210 include devices containing data that need processing time before loss of power occurs, such as disk drives. The secondary devices 212 include devices that do not need to process data before power loss occurs, such as fans, PCI devices, input/output (IO) devices, and computer processors.

To detect a power loss according to various embodiments of the invention, the detection circuit 214 coupled to the main power supply 204 is used. The detection circuit 214 may detect, for example, a drop in voltage, a drop in current, a drop in undercurrent, a drop in other input energy such as solar energy.

In various embodiments, the management processor 216 connects the detection circuit 214 with the soft switch 208. The management processor 216 may include a data bus or serial management bus. If the management processor 216 receives a signal from the detection circuit 214 of a drop in power, the management processor 216 sends a signal to the soft switch 208 to load shed the secondary devices 212. The signal may be an inter-integrated circuit ($I^2C$) signal or another signal understood in the art. Alternatively, the soft switch 208 may be coupled directly to the detection circuit 214 such that the detection circuit automatically initiates load shedding without the management processor's involvement. The management processor 216, according to various embodiments of the invention, may send Emergency Power Off Warnings (EPOW) to the primary devices 210. This EPOW may include signals to expanders, Serial Attached SCSI (SAS) commands to drives or other devices that require EPOW.

Figure 3:
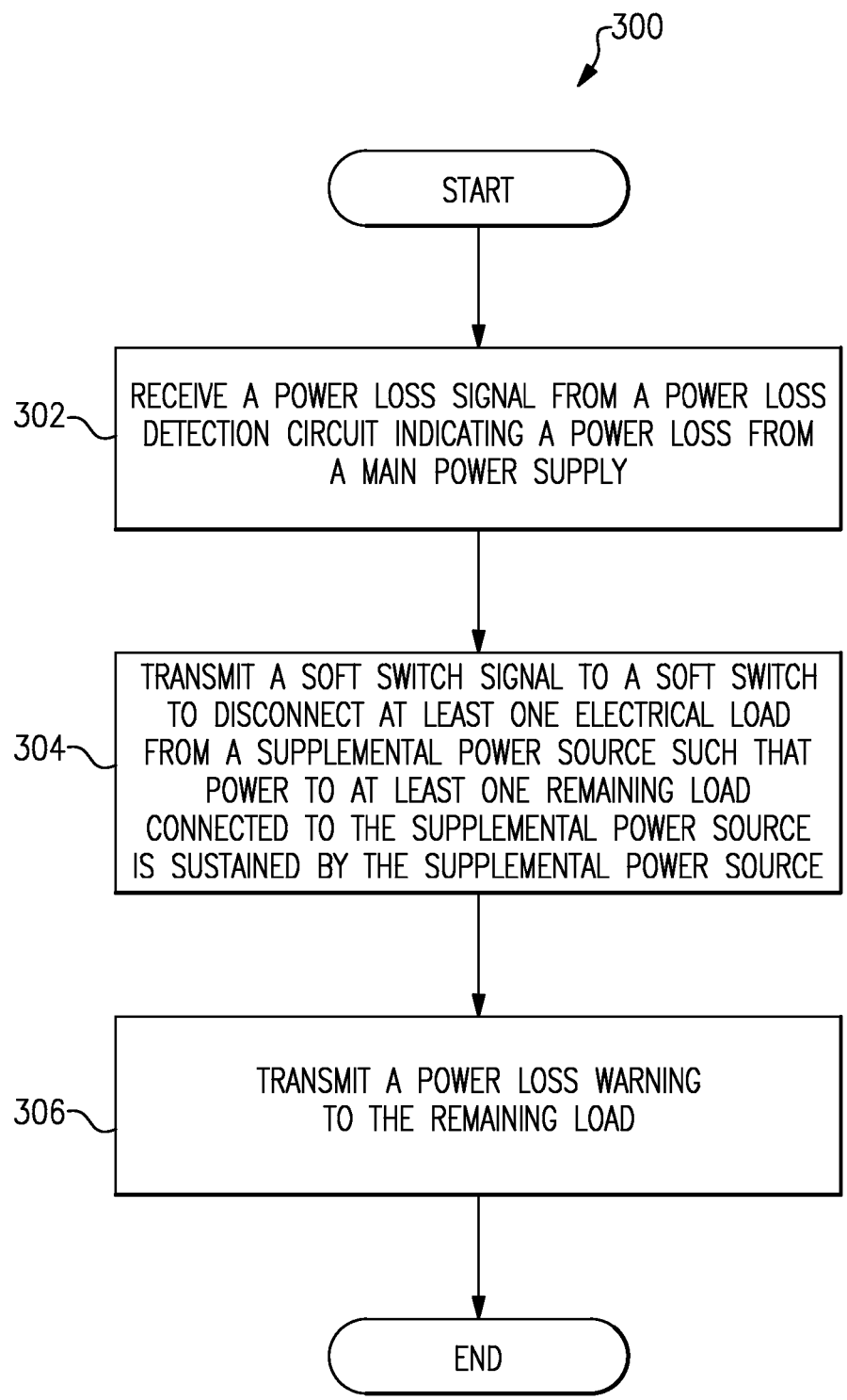
FIG. 3 is a flow diagram illustrating a method of load shedding during an emergency power off event according to an embodiment of the invention.

FIG. 3 is a flow diagram illustrating a method of load shedding during an emergency power off event according to an embodiment of the invention. Flow diagram 300 begins at block 302 and includes receiving a power loss signal from a power loss detection circuit indicating a power loss from a main power source. Power loss may include a drop in voltage, a drop in current, a drop in undercurrent, or drop in the amount of solar light.

Continuing at block 304, flow diagram 300 includes transmitting a soft switch signal to a soft switch to disconnect at least one electrical load from a supplemental power source such that power to at least one remaining load connected to the supplemental power source is sustained by the supplementary power source. The soft switch signal may include an inter-integrated circuit ($I^2C$) signal or another signal understood in the art that would flip the soft switch. The remaining load may be a hard drive or hard drive array. The supplemental power source may include, but is not limited to, holdup capacitance, a photocell, a battery, or regenerative power.

Flow diagram 300 also includes, at block 306, transmitting a power loss warning to the at least one remaining load. The power loss warning may include an Emergency Power Off Warning (EPOW). This EPOW may include signals to expanders, Serial Attached SCSI (SAS) commands to drives or other devices that require EPOW. The EPOW may include instructions to power down the device, to transfer data from a volatile to non-volatile source, or perform a set of additional emergency instructions in response to a power loss.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In a particular embodiment of the invention, there are two power supplies providing power to enclosure devices in a redundant manner. Each power supply includes the main power loss detection. Thus, both power supplies can independently detect main power. In this configuration, if the power cable to one power supply is unplugged, or if the input power otherwise drops, that power supply will detect loss of power. However, if just one power supply loses power, it does not trigger an emergency power off warning. The system will stay up with full function on the other power supply. Instead, a loss of input power to both power supplies at the same time is required to generate the warning, and subsequent steps to maintain power longer to the critical loads.

While the preferred embodiments to the invention has been described, it will be understood that those skilled in the art, both now and in the future, may make various improvements and enhancements which fall within the scope of the claims which follow.

What is claimed is:

1. A method comprising:
   supplying power from a main power source to a plurality of electrical loads within a device enclosure;
   detecting a power loss from the main power source;
   upon detecting the power loss, disconnecting at least one of the electrical loads from a supplemental power source such that power to at least one remaining load connected to the supplemental power source is sustained by the supplemental power source; and
   upon detecting the power loss, sending a power loss warning to the at least one remaining load.

2. The method of claim 1, further comprising energizing the supplemental power source within the device enclosure.

3. The method of claim 1, further comprising, upon detecting the power loss, disconnecting at least one of the electrical loads from the main power source.

4. The method of claim 1, further comprising, upon detecting the power loss, transferring data from a volatile memory to a non-volatile memory by the at least one remaining load.

5. The method of claim 1, further comprising, upon detecting the power loss, completing one or more open transactions by the at least one remaining load.

6. The method of claim 1, further comprising, upon detecting the power loss, transmitting an emergency signal by the at least one remaining load.

7. The method of claim 1, wherein detecting the power loss includes detecting that an output voltage from the main power source is below a threshold value.

8. An apparatus comprising:
   a main power supply within a device enclosure;
   a supplemental power supply within the device enclosure electrically coupled with the main power supply;
   a soft switch configured to disconnect at least one secondary device from the supplemental power supply upon power loss from the main power supply such that power to at least one primary device connected to the supplemental power supply is sustained by the supplemental power supply,
   a detection circuit coupled to the main power supply, the detection circuit configured to detect the power loss from the main power supply;
   a management processor coupled to the detection circuit and the soft switch; and
   wherein, upon detection of the power loss by the detection circuit, the management processor is configured to output a power loss warning to the at least one remaining load.

9. The apparatus of claim 8, wherein the supplemental power supply is electrically coupled with the main power supply in parallel circuit.

10. The apparatus of claim 8, wherein the supplemental power supply is a holdup capacitor.

11. The apparatus of claim 8, wherein the supplemental power supply includes a battery.

12. The apparatus of claim 8, wherein the at least one primary device is a hard drive.

13. The apparatus of claim 8, wherein the at least one primary device is a hard drive array.

14. The apparatus of claim 8, wherein the at least one secondary device is a fan.

15. The apparatus of claim 8, wherein the soft switch is a transistor.

16. A computer program product comprising:
   a non-transitory computer readable storage medium having computer readable program code embodied therewith, the computer readable program code configured to:
   receive a power loss signal from a power loss detection circuit indicating a power loss from a main power source;
   upon receipt of the power loss signal, transmit a soft switch signal to a soft switch to disconnect at least one electrical load from a supplemental power source such that power to at least one remaining load connected to the supplemental power source is sustained by the supplemental power source; and
   upon receipt of the power loss signal, transmit a power loss warning to the at least one remaining load.

* * * * *